Patented Jan. 11, 1927.

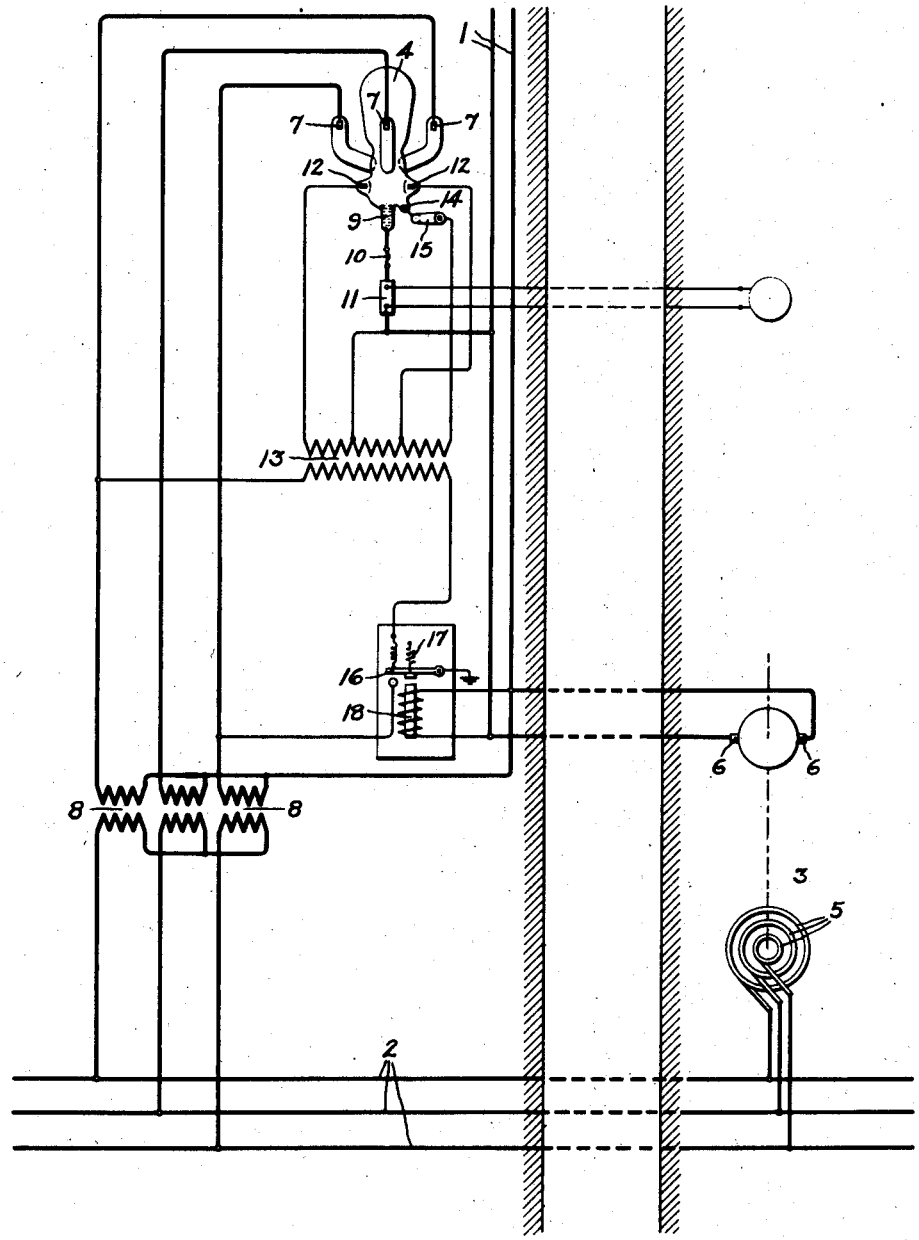

1,614,146

UNITED STATES PATENT OFFICE.

GUSTAV W. MÜLLER, OF CHARLOTTENBURG, GERMANY, ASSIGNOR TO GENERAL ELECTRIC COMPANY, A CORPORATION OF NEW YORK.

CONTROL SYSTEM.

Application filed February 27, 1926, Serial No. 91,216, and in Germany March 28, 1925.

My invention relates to systems for controlling the operation of a mercury arc rectifier connected in parallel with a rotary converter or other electrical machine, and has for its principal object the provision of an arrangement whereby the transmission of current through the rectifier is prevented until the machine has attained a predetermined voltage or other electrical condition.

It is sometimes necessary to operate a mercury rectifier in parallel with a rotary converter for transmitting current between alternating and direct current circuits. This arrangement has the disadvantage that overloading of the rectifier is likely to occur if the alternating current circuit is for any reason successively deenergized and energized. In accordance with my invention, this disadvantage is avoided by the provision of means which operate to initiate the transmission of current through the rectifier only when the converter has attained a predetermined electrical condition.

My invention will be better understood from the following description when considered in connection with the accompanying drawing and its scope will be pointed out in the appended claims.

The drawing shows a direct current circuit 1 and an alternating current circuit 2 which are interconnected through a rotary converter 3 and a rectifier 4 controlled in accordance with my invention.

The converter 3 is connected to the alternating current circuit 2 through slip rings 5 and to the direct current circuit 1 through brushes 6. The rectifier 4 comprises anodes 7 which are connected to the secondary terminals of a transformer 8, a cathode 9 which is connected to one side of the direct current circuit 1 through a protective device shown as a fuse 10 and a meter shunt 11, exciting electrodes 12 to which voltage is applied through a transformer 13, and a starting electrode 14 which is connected to a winding of the transformer 13 through a switch 15. The other end of this winding is connected to one of the exciting electrodes. Any suitable means such as inductance devices connected either in the exciting electrode leads or in the cathode lead of the exciting circuit, a transformer having a high reactance or the like may be utilized to insure continuity of the exciting arc. A relay switch 16 biased to its open position by a spring 17 is provided with an operating coil 18 which is connected to the direct current circuit 1 and the brushes 6 of the rotary converter 3. The rotary converter 3 and rectifier 4 have been shown as located in different substations. It will be apparent that the benefits of my invention are not limited to this arrangement.

When no voltage is applied to the alternating current circuit 2, the relay switch 16 is maintained in its open position by the spring 17. Upon the energization of the circuit 2, the relay switch 16 does not close until the rotary converter is operating and its direct current voltage has attained a value at which there is no danger of overloading the rectifier. As soon as this voltage is attained, however, the relay is operated to its closed position, the arc of the starting electrode is taken up by the exciting electrodes and the rectifier 4 assumes its proper share of the load. If the alternating current circuit 3 is deenergized and subsequently energized the rectifier is thus protected against overload and blowing of the fuse 10 is avoided.

The embodiment of the invention illustrated and described herein has been selected for the purpose of clearly setting forth the principles involved. It will be apparent, however, that the invention is susceptible of being modified to meet the different conditions encountered in its use and I therefore aim to cover by the appended claims all modifications within the true spirit and scope of my invention.

What I claim as new and desire to secure by Letters Patent of the United States is:

1. The combination of a direct current circuit, a mercury arc rectifier provided with an anode and cathode connected to said direct current circuit and with an excitation circuit for maintaining the arc of said rectifier, an electrical machine connected to said direct current circuit, and means for controlling the connections of said excitation circuit in accordance with an electrical condition of said machine.

2. The combination of direct and alternating current circuits, a rectifier provided with an anode and cathode for transmitting current between said alternating and direct current circuits and with an excitation circuit for maintaining the arc of said rectifier, an electrical machine connected between said alternating and direct current circuits, and means operable in accordance with an electrical condition of said machine for controlling the connections of said excitation circuit.

In witness whereof, I have hereunto set my hand this 8th day of February, 1926.

GUSTAV W. MÜLLER.